(12) United States Patent
Chitrala et al.

(10) Patent No.: US 10,921,000 B2
(45) Date of Patent: Feb. 16, 2021

(54) LIMITING OPERATION OF A HVAC SYSTEM FOR LOW-NOISE MUNICIPALITIES

(71) Applicant: Trane International Inc., Davidson, NC (US)

(72) Inventors: Arvind Chitrala, Tyler, TX (US); Don A. Schuster, Lindale, TX (US); John Hughes, Flint, TX (US); Karl J. Mutchnik, Tyler, TX (US)

(73) Assignee: Trane International Inc., Davidson, NC (US)

( * ) Notice: Subject to any disclaimer, the term of this patent is extended or adjusted under 35 U.S.C. 154(b) by 283 days.

(21) Appl. No.: 15/870,600

(22) Filed: Jan. 12, 2018

(65) Prior Publication Data
US 2019/0219280 A1   Jul. 18, 2019

(51) Int. Cl.
| | |
|---|---|
| *F24F 3/044* | (2006.01) |
| *F25B 29/00* | (2006.01) |
| *F03D 7/02* | (2006.01) |
| *F25B 49/02* | (2006.01) |
| *F25B 13/00* | (2006.01) |

(52) U.S. Cl.
CPC .......... *F24F 3/0442* (2013.01); *F03D 7/0276* (2013.01); *F03D 7/0296* (2013.01); *F25B 29/003* (2013.01); *F25B 49/02* (2013.01); *F25B 13/00* (2013.01); *F25B 2313/0294* (2013.01);
(Continued)

(58) Field of Classification Search
CPC .......... F25B 2600/0253; F25B 2600/11; F25B 2600/111; F25B 2600/0252; F25B 2600/025; F25B 2313/0294; F03D 7/0276; F03D 7/0296
See application file for complete search history.

(56) References Cited

U.S. PATENT DOCUMENTS

| | | | | |
|---|---|---|---|---|
| 3,853,174 A | * | 12/1974 | Kramer ................... | F25B 39/04 165/287 |
| 10,060,648 B2 | * | 8/2018 | Kim ........................ | F24F 13/24 |

(Continued)

OTHER PUBLICATIONS

Air-Conditioning, Heating, and Refrigeration Institute (AHRI); "Application of Outdoor Unitary Equipment A—Weighted Sound Power Ratings"; ANSI/AHRI Standard 275; 2010; 19 pages.

*Primary Examiner* — Nelson J Nieves
*Assistant Examiner* — Meraj A Shaikh
(74) *Attorney, Agent, or Firm* — Womble Bond Dickinson (US) LLP

(57) ABSTRACT

A sound level control system for a heating, ventilation, and air conditioning (HVAC) system is provided. The sound level control system comprises an outdoor unit with a compressor, an outdoor fan, and an outdoor controller and a communication device located at a predefined distance from the outdoor unit. The communication device measures sound levels in response to operating the outdoor unit. The outdoor controller is configured to receive a first noise level limit for a predefined time period, receive an instruction related to selective control of the outdoor unit, selectively control both of the compressor to rotate at a first compressor speed and the outdoor fan to rotate at a first fan speed based on the noise level limit for the predefined time period, and receive information related to whether a sound pressure level at a predefined location exceeds the first noise level limit for the predefined time period.

12 Claims, 5 Drawing Sheets

(52) U.S. Cl.
CPC ... *F25B 2500/12* (2013.01); *F25B 2600/0253* (2013.01)

(56) References Cited

U.S. PATENT DOCUMENTS

| | | | |
|---|---|---|---|
| 2005/0223725 A1* | 10/2005 | Crane | F25B 49/02 62/183 |
| 2010/0094466 A1* | 4/2010 | Judge | F25B 49/02 700/275 |
| 2015/0300671 A1 | 10/2015 | Coleman et al. | |
| 2015/0300684 A1* | 10/2015 | Mehta | F24F 13/24 62/56 |
| 2015/0300715 A1* | 10/2015 | Jeon | F24F 1/40 62/89 |
| 2017/0314799 A1 | 11/2017 | LeRoy et al. | |

\* cited by examiner

LIMITING OPERATION OF A HVAC SYSTEM FOR LOW-NOISE MUNICIPALITIES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A heating, ventilation, and air conditioning (HVAC) system generally includes a compressor, a condenser, an expansion device, and an evaporator, forming a refrigeration circuit. The HVAC system also generally includes a compressor and a condenser fan coupled to the condenser. The condenser fan and compressor of the HVAC system can be combined in a single outdoor unit (e.g., a refrigeration unit). One or more refrigeration units can be included in an HVAC system for a residential building based on the cooling requirements of the residential building. During operation, a refrigeration unit generates sound and vibration from the condenser fan and compressor. In neighborhoods, a residential building may be located relatively close to a property line of an adjacent residential building and sound from an outdoor unit may have to be controlled according to local ordinances. Thus, depending on a location of the residential building in a municipality, an HVAC system that is installed for the residential building may have maximum noise level limits for daytime and nighttime operation of the HVAC system. These noise level limits may be, for example, based on local ordinances or other similar regulations defined by this low-noise municipality. Conventionally, these noise level limits are controlled by ramping down operation to an absolute minimum speed. For example, when operating the HVAC system in a quiet mode, the refrigeration unit is ramped down to an absolute minimum rotational speed of the compressor, which may reduce the HVAC system's ability to provide air conditioned at a desired temperature, thus causing discomfort to occupants of the residential building.

SUMMARY OF THE DISCLOSURE

In an embodiment, a sound level control system for a heating, ventilation, and air conditioning (HVAC) system is provided. The sound level control system comprises an outdoor unit with a compressor, an outdoor fan, and an outdoor controller and a communication device located at a predefined distance from the outdoor unit. The communication device is configured to measure sound levels in response to operating the outdoor unit. The outdoor controller is communicatively coupled to the communication device and is configured to receive a first noise level limit for a predefined time period that is predefined for the HVAC system, receive an instruction related to selective control of the outdoor unit, selectively control both of the compressor to rotate at a first compressor speed and the outdoor fan to rotate at a first fan speed based on the noise level limit for the predefined time period, and receive information related to whether a sound pressure level (SPL) at a predefined location exceeds the first noise level limit for the predefined time period in response to controlling each of the compressor at the first compressor speed and the outdoor fan at the first fan speed.

In another embodiment, a method for controlling a sound level for a heating, ventilation, and air conditioning (HVAC) system with an outdoor controller is provided. The method comprises providing the HVAC system including a compressor, an outdoor fan, a system controller and an outdoor controller; and communicatively coupling a remotely located communication device to the outdoor controller. The method also comprises receiving an instruction associated with selective control of the outdoor unit, selectively controlling both of the compressor and the outdoor fan to rotate at a first compressor speed and a first fan speed, and receiving information related to whether the SPL exceeds a first noise level limit for a predefined time period of a plurality of time periods in response to receiving the first noise level.

In yet another embodiment, a method for determining a maximum speed of a compressor and an outdoor fan for a heating, ventilation, and air conditioning (HVAC) system is provided. The method comprises receiving information related to sound power levels of an outdoor unit, where the outdoor unit comprises an outdoor fan and a compressor, receiving corresponding rotational speeds of the compressor and the outdoor fan at respective sound power levels of the outdoor unit, determining estimated maximum rotational speeds of the compressor and the outdoor fan speed based on sound power levels of the outdoor unit, and determining an estimated SPL value for each of the estimated maximum rotational speeds of the compressor and the outdoor fan according to the sound power levels of the outdoor unit.

For the purpose of clarity, any one of the embodiments disclosed herein may be combined with any one or more other embodiments disclosed herein to create a new embodiment within the scope of the present disclosure.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Thus, while the present disclosure may generally focus on operational modes of compressors that are employed in HVAC applications, it is to be understood that the present disclosure is applicable to any suitable type of a heat pump system and applications.

Disclosed herein are embodiments for dynamically limiting operation of an HVAC system in low-noise municipalities. The HVAC system may be installed in a residential building to provide heating and cooling to the interior of the residential building. However, the HVAC system may generate noise when operating an outdoor unit of the HVAC system. For example, a compressor and outdoor fan motor of the HVAC system may generate noise during HVAC system operation. This noise level may be measured as a sound pressure level or a sound power level, which may exceed the noise level limits in effect during the daytime and/or nighttime HVAC system operation for the low-noise municipality. Measurement devices such a portable device with applications comprising one or more algorithms may be used to determine the applicability of an HVAC system for a particular location based on the sound pressure levels and/or the sound power levels generated by the particular HVAC system. These algorithms may be used to determine estimated noise levels prior to and/or during pre-assessment of an HVAC system in order to determine estimated noise levels and actual noise levels at a property line of the residential building during a plurality of time periods of operation of the HVAC system. These noise levels may be used to limit operation of the compressor and fan motor for defining a daytime quiet operating mode and a nighttime quiet operating mode as well as other modes. Disclosed herein are embodiments for dynamically determining the fan motor and compressor speed (i.e., a rotational speed) of an outdoor unit that meets the noise levels that are in effect for daytime and nighttime operation of the HVAC system. The disclosed embodiments further provide the demand information to the HVAC controller to meet the daytime and nighttime operating modes of the HVAC system that consequently satisfy the noise levels during the daytime and nighttime periods while maximizing comfort to the occupants of the residential building.

Figure 1:
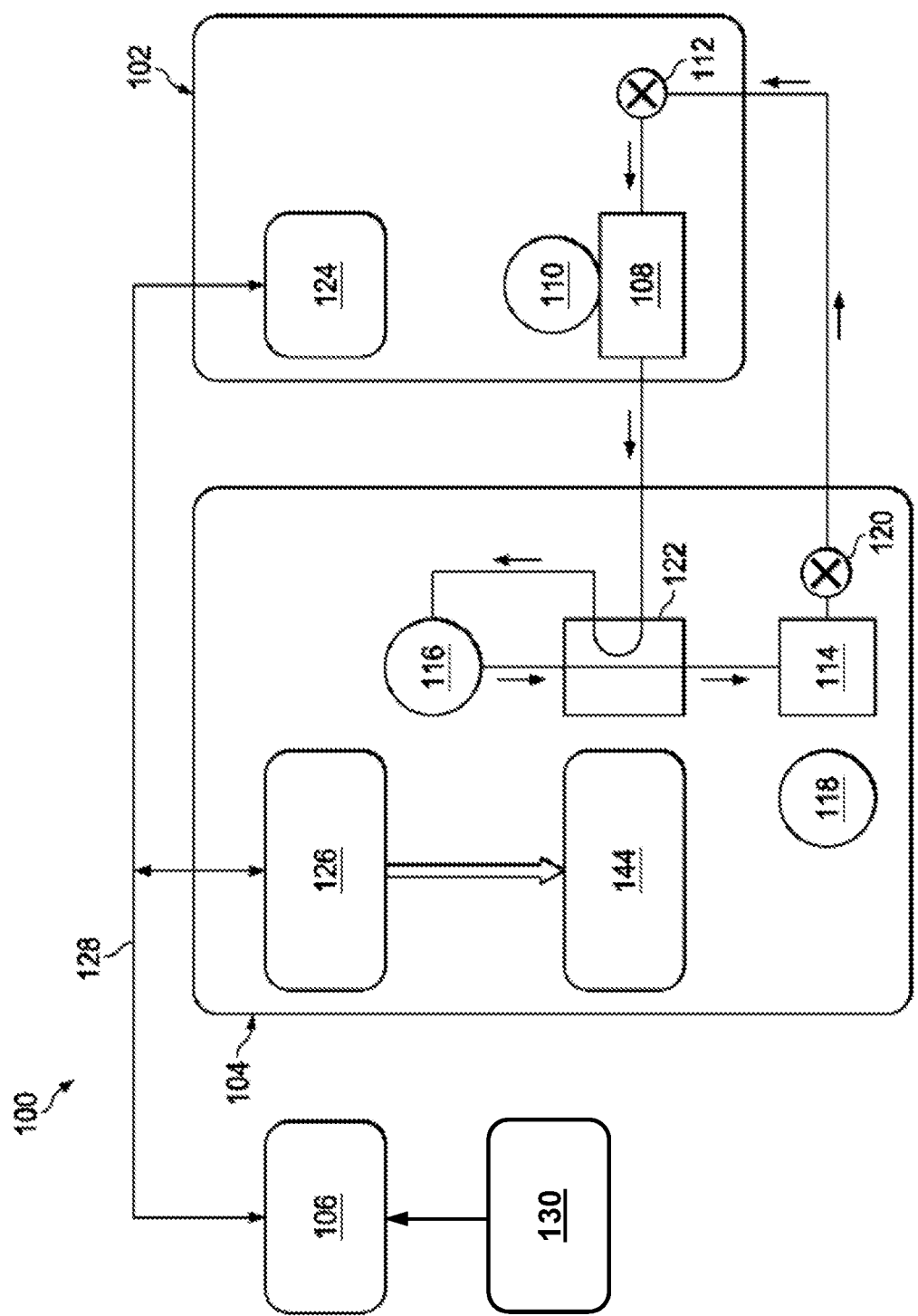
FIG. 1 is a schematic diagram of a HVAC system according to an embodiment of the disclosure.

Referring now to the figures, FIG. 1 depicts a schematic diagram of HVAC system 100 for providing cooling and/or heating functionality to a building or other buildings according to an embodiment of the disclosure. The HVAC system 100 may be configured as a heat pump system and generally comprises an indoor unit 102, an outdoor unit 104, and a system controller 106. Generally, the heat pump system may be selectively operated to implement one or more substantially closed thermodynamic refrigeration cycles to provide a cooling functionality (hereinafter "cooling mode") and/or a heating functionality (hereinafter "heating mode") at different operating modes over various periods of the day.

The system controller 106 may generally control operation of the indoor unit 102 and/or the outdoor unit 104. In an example, the system controller 106 comprises a user interface that may be configured with a thermostat 130 for receiving user inputs and for displaying system settings. The system controller 106 may be configured for bidirectional communication with the thermostat 130. For example, the system controller 106 may allow a user to communicate user settings to the system controller 106 via the thermostat 130 in order to control a temperature setting, a humidity setting, and/or other environmental settings for the HVAC system 100. Further, the thermostat may be coupled to one or more sensors located in the outdoor unit 104, the indoor unit 102, and/or ducts that are coupled to indoor unit 102 or outdoor unit 104 in order to sense temperature, humidity, and/or other environmental information and communicate this information back to the system controller 106. The system controller 106 may be configured for bidirectional communication with the thermostat 130 so that a user may, using the system controller 106, monitor and/or control any of the HVAC system 100 components to meet user defined and/or HVAC system 100 defined parameters for operating the HVAC system 100 to meet noise level limits for a plurality of operating modes in low-noise municipalities where the HVAC system 100 is located (i.e., in a residential building in a neighborhood having a noise ordinance).

Indoor unit 102 is operable for heat exchange with a refrigerant carried within the indoor unit 102. In an embodiment, indoor unit 102 generally comprises an indoor air handling unit comprising an indoor heat exchanger 108, an indoor fan 110, an indoor metering device 112, and an indoor controller 124. Indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In one non-limiting example, the indoor heat exchanger 108 may comprise a plate-fin heat exchanger. However, in other examples, indoor heat exchanger 108 may comprise a microchannel heat exchanger and/or other suitable type of heat exchanger.

Also shown in FIG. 1, indoor fan 110 may generally comprise a variable speed blower comprising a blower housing, a blower impeller at least partially disposed within the blower housing, and a blower motor (not shown) configured to selectively rotate the blower impeller. The indoor fan 110 may generally be configured to provide airflow through indoor unit 102 and/or indoor heat exchanger 108 to promote heat transfer between the airflow and a refrigerant flowing through the indoor heat exchanger 108. Indoor fan 110 may also be configured to deliver temperature-conditioned air from indoor unit 102 to one or more areas and/or zones of a climate controlled building. Indoor fan 110 may generally be configured as a modulating and/or variable speed fan capable of being operated at many speeds over one or more ranges of speeds. In other embodiments, indoor fan 110 may be configured as a multiple speed fan capable of being operated at a plurality of operating speeds by selectively receiving different electrical voltages and/or frequencies at one or more electromagnetic windings of a motor (not shown) of indoor fan 110. In another example, indoor fan 110 may be a single speed fan that is configured to operate at a single speed.

An indoor metering device 112 of HVAC system 100 may generally comprise an electronically-controlled motor-driven electronic expansion valve (EEV). In some embodiments, however, indoor metering device 112 may comprise a thermostatic expansion valve, a capillary tube assembly, and/or any other suitable metering device. In some embodiments, while the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

Outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. In some embodiments, outdoor heat exchanger 114 may comprise a plate-fin heat exchanger. However, in other embodiments, outdoor heat exchanger 114 may comprise a spine-fin heat exchanger, a microchannel heat exchanger, or any other suitable type of heat exchanger.

Compressor 116 may generally comprise a variable speed drive compressor that is selectively controlled by the system controller 106 to rotate at one of several compressor speeds. In an embodiment, compressor 116 and outdoor fan 118, driven by a fan motor, of outdoor unit 104 may be selectively controlled to rotate at several rotating speeds when operating the HVAC system 100 in a plurality of operating modes. For example, compressor 116 and outdoor fan 118 may be selectively rotated up to a maximum rotational speed, rotated at a lower rotational speed in a daytime quiet operating mode during periods in which the noise level limits are in effect for operation of the HVAC system 100 and rotated at an even lower rotational speed in a nighttime quiet operating mode during periods in which there are maximum noise level limits in effect. In embodiments, daytime quiet mode of operation and nighttime quiet mode of operation may be defined at different time periods of the day (i.e., defined hourly), include different noise levels by days of the week (i.e., one or more different noise level limits by the day of the week), or different noise level limits for a weekday (i.e., Monday-Friday) and another noise level limit for a weekend (i.e., Saturday or Sunday). Sound or noise levels may be measured as sound pressure level (hereinafter "SPL"), which may vary according to air density, temperature and humidity. In other embodiments, sound or noise levels may be measured as sound power levels at the outdoor unit 104. As defined herein, an SPL value, in A-weighted decibels (dBA), may be defined according to the Air-conditioning, Heating and Refrigeration Institute's (AHRI) standard 275 and is a logarithmic ratio of the sound power radiated by a sound generating source to a reference sound power or a logarithmic ratio of a sound pressure of the sound generating source to a reference sound pressure of 20 micropascal (μPa). In some examples, compressor 116 is a modulating multi-stage compressor that is capable of operation over a plurality of speed ranges, a variable speed scroll compressor, and/or any other suitable refrigerant compressor and/or refrigerant pump that is operated at a plurality of rotational speeds. In some embodiments, the compressor 116 may be controlled by a compressor drive controller 144, also referred to as a compressor drive and/or a compressor drive system.

The noise level limits for operating the HVAC system 100 may be determined by the low-noise municipality in which the HVAC system 100 is located and may vary across municipalities. In some examples, the noise level limits are determined by measuring SPL values for the compressor 116 and outdoor fan 118 at various distances and/or locations from the outdoor unit 104 or by measuring a sound power level (in dB) at the outdoor unit 104. In some embodiments, SPL values may vary by the time period of the day or the day of the week when these SPL values are to be enforced may also vary, In embodiments, SPL values may be measured at a property line of a residential building or at a habited location of a neighboring residential building, as will be shown and described below with reference to FIG. 3. During the daytime quiet and nighttime quiet operating modes, compressor 116 may be configured to pump refrigerant at a plurality of mass flow rates through the indoor unit 102, the outdoor unit 104, and/or between the indoor unit 102 and the outdoor unit 104 depending on the rotational speed of the compressor 116. Typically, a compressor and outdoor fan (i.e., fan motor and fan blade assembly), which is controlled by the compressor, generate a certain amount of noise when operating at certain rotational speeds. For example, compressor 116 and outdoor fan 118 generate a relatively higher amount of sound when operated at a higher level of speed, and a relatively lower amount of sound when operated at a lower level of speed, but operating at a lower level of speed may lower the capacity of the HVAC system 100 and result in discomfort to the occupants. However, in the HVAC system 100, the compressor speed and the outdoor fan speed may be optimized to operate at maximum capacity within the noise level limits defined for a plurality of daytime quiet and nighttime quiet modes for a particular location in order to maintain a comfort level to the occupants of a residential building, as will be shown and described below in FIGS. 2-4.

Outdoor fan 118 of outdoor unit 104 may generally comprise an axial fan comprising a fan blade assembly and fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the outdoor heat exchanger 114. Outdoor fan 118 may generally be configured as a modulating and/or variable speed fan that is capable of being operated at a plurality of speeds over a plurality of speed ranges by controlling the compressor speed. In other embodiments, outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In yet other embodiments, outdoor fan 118 may be a single speed fan. Further, in other embodiments, however, outdoor fan 118 may comprise a mixed-flow fan, a centrifugal blower, and/or any other suitable type of fan and/or blower.

An outdoor metering device 120 may generally comprise a thermostatic expansion valve. In some embodiments, outdoor metering device 120 may comprise an electronically-controlled motor driven EEV similar to indoor metering device 112, a capillary tube assembly, and/or any other suitable metering device. While outdoor metering device 120 may be configured to meter the volume and/or flow rate of refrigerant through the outdoor metering device 120, in some embodiments, outdoor metering device 120 may also comprise and/or be associated with a refrigerant check valve and/or refrigerant bypass configuration when the direction of refrigerant flow through the outdoor metering device 120 is such that outdoor metering device 120 is not intended to meter or otherwise substantially restrict flow of the refrigerant through the outdoor metering device 120.

A reversing valve 122 may generally comprise a four-way reversing valve. Reversing valve 122 may also comprise an electrical solenoid, relay, and/or other device configured to selectively move a component of reversing valve 122 between operational positions to alter the flow path of refrigerant through the reversing valve 122 and consequently the HVAC system 100. Additionally, reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. In some embodiments, the system controller 106 may be configured to monitor and/or communicate with a plurality of temperature sensors associated with components of the indoor unit 102, the outdoor unit 104, and/or the ambient outdoor temperature. Additionally, in some embodiments, the system controller 106 may comprise a temperature sensor and/or a humidity sensor and/or may further be configured to control heating and/or cooling of zones associated with the HVAC system 100. In other embodiments, however, the system controller 106 may be configured as a thermostat for controlling the supply of conditioned air to zones associated with the HVAC system 100. The system controller 106 may also be configured to control a capacity of the HVAC system 100 based on the noise level limits defined for operating the HVAC system 100 in a plurality of operating modes as discussed above. As used herein, controlling a capacity of the HVAC system 100 may include controlling a rotational speed of the compressor 116 to operate in a plurality of operating modes such as, for example, operating in the daytime quiet and nighttime quiet operating modes.

The system controller 106 may also generally comprise a touchscreen interface for displaying information to a user and for receiving user inputs from the user. The system controller 106 may display information related to the operation of the HVAC system 100 in the daytime quiet operating mode and a nighttime quiet operating mode and may also receive user inputs related to configuring the HVAC system 100 to operate in the daytime quiet operating mode a nighttime quiet operating mode as well as other modes as needed, during execution of a pre-assessment algorithm for execution of a commissioning algorithm. In an example, the pre-assessment algorithm is used to determine estimated SPL values at a predefined/predetermined distance from a location of an outdoor unit adjoining a residential building before the outdoor unit such as, for example, an outdoor unit 104 is installed in order to gauge the suitability of the outdoor unit 104 to operate in a plurality of operating modes while providing the requisite comfort at the different operating modes. In another example, the commissioning algorithm is used to determine actual sound levels as SPL values at the predefined distance from the location of the outdoor unit 104 (hereinafter "predetermined location") and for configuring the HVAC system 100 to operate in the plurality of operating modes when the HVAC system 100 is being operated to provide cooling and/or a heating to the residential building. Also, the system controller 106 may be operable to display information and receive user inputs tangentially and/or unrelated to operation of the HVAC system 100. In some embodiments, however, the system controller 106 may not comprise a display and may derive all information from inputs from remote sensors and remote configuration tools.

In some embodiments, the system controller 106 may be configured for selective bidirectional communication over a communication bus 128. In embodiments, portions of the communication bus 128 may comprise a three-wire connection suitable for communicating messages between the system controller 106 and one or more of the HVAC system 100 components configured for interfacing with the communication bus 128. In another embodiment, the system controller 106 may be configured for selective bidirectional communication via a wired or wireless communication network, such as The Institute of Electrical and Electronics Engineers (IEEE) 802.11 wireless network, an IEEE 802.3 wired network, or any other suitable wired or wireless communication technology.

The indoor controller 124 may be carried by the indoor unit 102 and may generally be configured to receive information inputs, transmit information outputs, and/or otherwise communicate with the system controller 106, the outdoor controller 126, and/or any other device via the communication bus 128 and/or any other suitable medium of communication. In some embodiments, the indoor controller 124 may be configured to receive information related to a speed of the indoor fan 110, transmit a control output to an auxiliary heat source, transmit information regarding an indoor fan 110 volumetric flow-rate, communicate with and/or otherwise affect control over an air cleaner, and communicate with an indoor EEV controller. In some embodiments, the indoor controller 124 may be configured to communicate with an indoor fan 110 controller and/or otherwise affect control over operation of the indoor fan 110.

The outdoor controller 126 may be carried by the outdoor unit 104 and may be configured to receive information inputs, transmit information outputs, and/or otherwise communicate with the system controller 106, the indoor controller 124, and/or any other device via the communication bus 128 and/or any other suitable medium of communication. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In some embodiments, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may flow from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to a two-phase (vapor and gas) mixture. The two-phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108, and causing evaporation of the liquid portion of the two-phase mixture. The refrigerant may thereafter re-enter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may re-enter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

In an embodiment, the HVAC system 100 may be configured to implement a plurality of algorithms. In some embodiments, HVAC system 100 may be configured to selectively control a rotational speed of the compressor 116 and the outdoor fan 118. Controlling the rotational speed of the compressor 116 also controls a rotational speed of the outdoor fan 118. Selective control of the rotational speed of the compressor 116 is used by a communication device 310 (FIG. 3) to determine whether estimated noise measurements of an outdoor unit of the HVAC system 100, such as outdoor unit 104, meets noise level limits in a low-noise municipality. Further, the actual noise measurements of outdoor unit 104 may also be determined. Also, the outdoor unit 104 is controlled in a plurality of operating modes in order to satisfy the noise level limits in effect during operation of outdoor unit 104 while also providing the requisite cooling and/or heating to provide comfort to the occupants of the residential building. For example, a pre-assessment algorithm may be used at an outdoor location of a residential building, for example, at a property line of the residential building, in order to determine estimated SPL's. Also, in an example, a site commission algorithm may be used at the outdoor location of the residential building, for example, at the property line of the residential building or a habited location at a neighboring residential building, in order to determine actual SPL.

Figure 2:
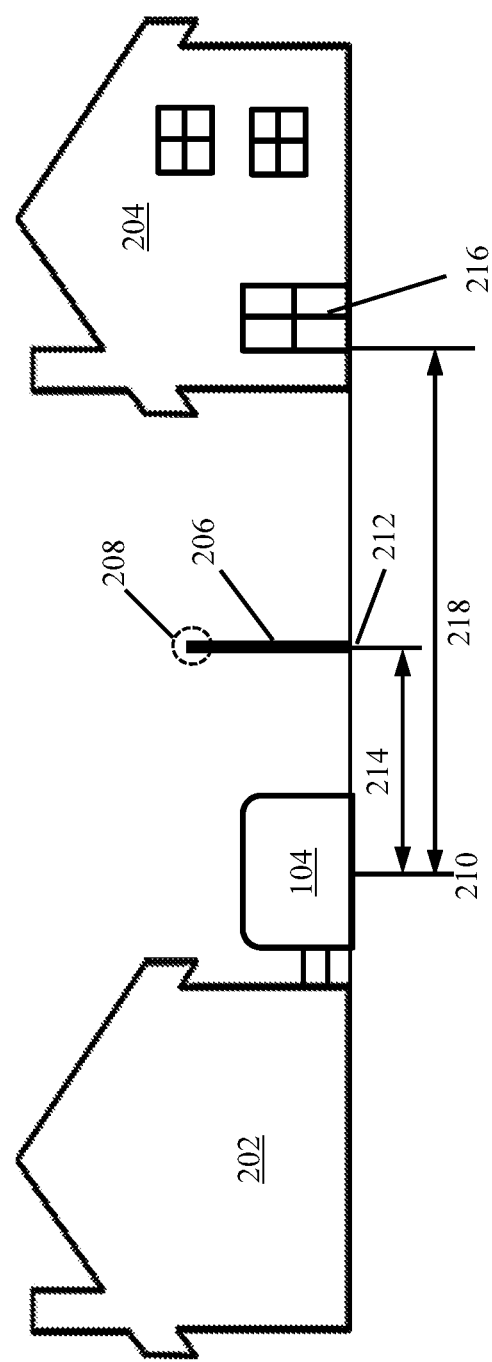
FIG. 2 is a schematic diagram of an environment of the HVAC system of FIG. 1 according to an embodiment of the disclosure.

In an embodiment, with reference to FIG. 2, estimated SPL values and actual SPL values may be determined at the predetermined location, for example, at a property line 212 or a habited location 216 and the outdoor unit 104 may be configured to meet a daytime quiet operating mode and a nighttime quiet operating mode of HVAC system 100 at the property line 212 or a habited location 216 (for example, a door or a window). The predetermined location can include other locations that are at various distances from the outdoor unit 104. The noise level limits may be defined by the low-noise municipality as the exterior sound level levels from an operating outdoor unit 104 of the HVAC system 100 and which may not be exceeded when measured at the predetermined location of the residential building 202. In examples, the predetermined location is the property line 212, which is a distance 214 (e.g., typically referred as zero-ft line) from location 210 of the outdoor unit 104 that adjoins the residential building 202, or is habited location 216, which is a distance 218 from location 210. In an example of a noise ordinance for Seattle, Wash., the SPL value may be predefined at 55 dBA for daytime quiet operating mode during a first time period of the day (for example, 9 AM-10 PM), at 45 dBA for nighttime quiet operating mode during a second time period of the day (for example, 10 PM-9 AM), at. In another example of a noise ordinance for Portland, Oreg., the SPL values may be predefined at 50 dBA for daytime quiet and nighttime quiet operating modes at all time periods of the day. In embodiments, weekend and weekday SPL values may defined to be the same SPL value or may be different SPL values for weekday and weekend operation. As used herein, "day" is a 24-hour time period and includes daytime and nighttime. In some examples, the time periods for daytime quiet operating mode and nighttime quiet operating mode may be changed at a system controller 106 by a user or may be received at the system controller 106 from a remote server over a network that is communicatively coupled with system controller 106 over the network such as, for example, a local area network (LAN) or a wide area network (WAN). The residential building 202 may be adjacent to a neighboring residential building 204 and the property line 212 may define the location where the noise level limits are measured in order to meet the low-noise municipality noise level limits. In another embodiment, the habited location 216 may define the location where the noise level limits are measured. A fence 206 or other sound attenuating barriers (sound shielding) may be present that reduces the SPL value at the property line 212. Therefore, an SPL value at the property line 212 is measured at the loudest location 208 at the fence 206, which is a location on property fence 206 to the upper levels of residential building 204, as defined in AHRI's standard 275 ("AHRI 275").

Figure 3:
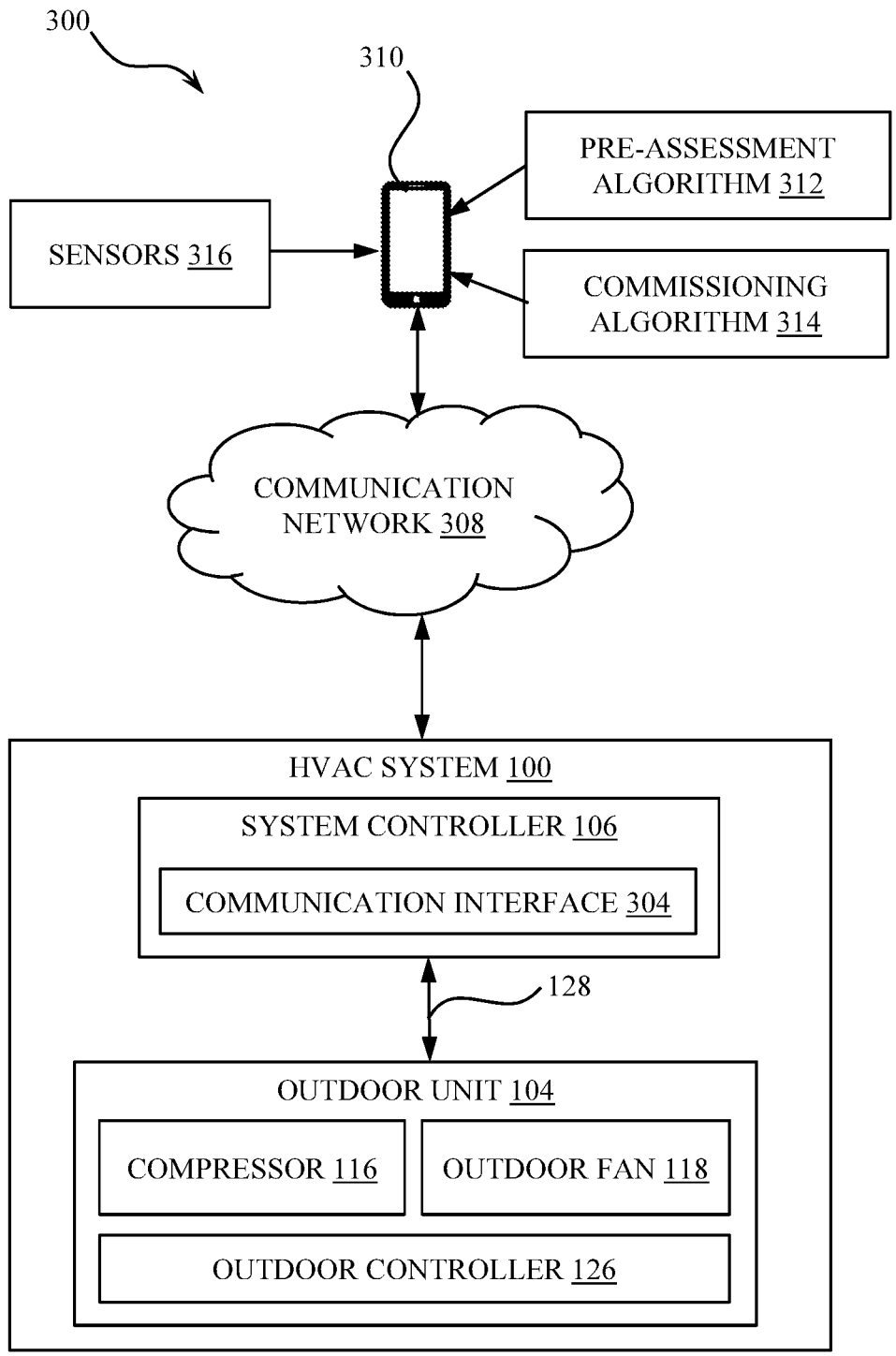
FIG. 3 is a schematic diagram of a control system for implementing noise level limits on the HVAC system of FIG. 1 according to an embodiment of the disclosure.

FIG. 3 depicts a control system 300 that is used for determining a SPL value at the predetermined location from an outdoor unit 104 (FIG. 1) such as, for example, at a property line of a residential building 202 or at a habited location 216 of a neighboring building 204 in FIG. 2 in order to configure the HVAC system 100 for daytime quiet and nighttime quiet operating modes. In an embodiment, control system 300 comprises the HVAC system 100 that is communicatively coupled to a communication device 310 via a communication network 308. Communication network 308 may be a wired or wireless communication network, such as an IEEE® 802.11 wireless network, an IEEE® 802.3 wired network or any other suitable wired or wireless communication technology. In examples, control system 300 may be used to estimate SPL values at a property line prior to installation of the HVAC system 100 and may be used to determine actual sound levels at the property line during operation of the HVAC system 100.

Also shown in FIG. 3, the HVAC system 100 comprises a system controller 106 and outdoor unit 104. It is to be appreciated that other components of HVAC system 100 described with reference to FIG. 1 also are included in FIG. 3 but are not being repeated for conciseness. In an example, system controller 106 includes a communication interface 304. In an example, Communication interface 304 is a graphical user interface (GUI) such as a thermostat 130 (FIG. 1), that is operable to display operating parameters of components of the HVAC system 100 including displaying information related to SPL values of compressor 116 (FIG. 1) and outdoor fan 118 that are measured at a predetermined location from the outdoor unit 104. Communication interface 304 is coupled to system controller 106 and may transmit user settings to system controller 106. In one example, communication interface 304 may receive user inputs for a sound level limit, a temperature setting, a humidity setting, and/or other environmental settings of the HVAC system 100. Communication interface 304 may also be coupled to one or more sensors located in the outdoor unit 104, indoor unit 102, and ducts coupled to indoor unit 104 to communicate temperature, humidity, and/or other environmental information in which the HVAC system 100 is located to the system controller 106. The system controller 106 may be configured for selective bidirectional communication with outdoor unit 104 over the communication bus 128.

Communication device 310 may be a smart phone, a tablet device, or other similar portable device that may be programmed to transmit and receive information related to operating modes of the HVAC system 100. In this embodiment, communication device 310 includes a sound sensor that is used to measure SPL values of outdoor unit 104 at various distances from outdoor unit 104 including measurement of SPL values at the predetermined location (i.e., at the property line, at a habited location of a neighboring building, or other location. Communication device 310 may receive information outputs from outdoor controller 118 related to HVAC system 100 settings, may transmit SPL values of outdoor unit 104 to system controller 106, determine sound level limits at the property line while outdoor unit 104 is operating, and/or otherwise communicate with outdoor unit 104 using information inputs received from communication device 310. In an embodiment, system controller 106 may be configured to receive information inputs from communication device 310 such as, for example, estimated SPL values at the property line during execution of pre-assessment algorithm 312 or may be configured to receive actual SPL values measured at the predetermined location from outdoor unit 104 using the sensor 316 in communication device 310 or other sensors that are placed at predefined distances from the predetermined location during execution of commissioning algorithm 314. In some embodiments, system controller 106 may use the actual SPL values and the estimated SPL values to determine maximum operable compressor speeds of compressor 116 and fan speeds of outdoor fan 118 (FIG. 1) for operating in each of the daytime quiet operating mode and nighttime quiet operating mode so as to conform to the noise level limits in effect during each time period.

In order to enable a user or technician to determine estimated and actual noise levels of the compressor 116 and outdoor fan 118 at a predetermined location from outdoor unit 104, during a plurality of rotational speeds of the compressor 116 and outdoor fan 118 without traversing back and forth between the system controller 106 and the property line, the user may use a communication device 310 that includes pre-assessment algorithm 312 and commissioning algorithm 314.

In an embodiment, communication device 310 may be configured to execute a pre-assessment algorithm 312 in order to determine whether estimated SPL values at the predetermined location of a residential building may meet noise level limits that are defined by the low-noise municipality prior to installation and/or operation of outdoor unit 104. In an embodiment, noise level limits corresponding to a daytime quiet operating mode and nighttime quiet operating mode may be predefined in the communication device 310. In an embodiment, the pre-assessment algorithm 312 may be stored in memory at communication device 310 and may be used to determine estimated SPL values, in dBA, from user inputs related to the location of a potential outdoor unit from the predetermined location and sensor information located at the predetermined location or other locations adjacent to the outdoor unit 104. Sensor inputs (for example, background noise) may be received from sensors located in communication device 310 or from sensors 316 remotely located from the communication device 310, for example, located at the predetermined location. User and/or sensor inputs may include information related to background noise, quantity of reflective surfaces at the property line and/or around the outdoor unit 104, such as fences, or other barriers at the predetermined location or around the outdoor unit 104 that may help to attenuate any noise that is generated by the outdoor unit 104, distance of the predetermined location from the outdoor unit 104, sound rating input of the outdoor unit 104 (for example, power of the outdoor unit 104 as defined in AHRI 275), or the like.

In an embodiment, information related to sound power levels may be mapped to compressor speeds and fan speeds to determine an estimated SPL for maximum operating speeds of the compressor and the outdoor fan. In an embodiment, sound power levels based on a sound rating level of the outdoor unit 104 may be mapped to compressor speeds of the compressor 116 and fan speeds of an outdoor fan 118 in order to estimate SPL values according to maximum rotational speeds of the compressor and the outdoor fan. The mapped speeds may be stored in a table in memory at the communication device 310. The information in the mapped table may be used by pre-assessment algorithm 312 to determine estimated maximum daytime and nighttime compressor speed and outdoor fan speed and their corresponding estimated SPL values by using sound power levels of the outdoor unit, equipment location factor, barrier shielding factor, sound path factor, and distance to the point of evaluation (distance factor), or the like. In an embodiment, estimated SPL values may be determined according to the following equation: Estimated SPL (in dBA)=Sound Power Rating Level of the outdoor unit 104+Equipment Location Factor−Barrier Shielding Factor−Sound Path Factor−Distance Factor. In an embodiment, estimated SPL values for various compressor and outdoor fan speeds may be transmitted in a form for evaluation by an inspector of the municipality in which the HVAC system 100 is being installed.

In another embodiment, pre-assessment algorithm 312 may be used to determine estimated SPL values at the predetermined location using sensor information and user inputs in order to assess whether the potential outdoor unit 104 may be able to meet the defined noise level limits at the predetermined location during the operating modes and provide the requisite cooling and/or heating to an internal space of the residential building at the predefined noise level limits. If the potential outdoor unit 104 may not be able to meet noise level limits for the various operating modes, another outdoor unit may be evaluated for the location, additional distance from the outdoor unit 104 to the predetermined location may be evaluated, and/or additional attenuating barriers such as enclosures or other barriers surrounding the potential location of the outdoor unit 104 may be considered.

In another embodiment, system controller 106 may communicate with an outdoor controller 126 in order to execute a commissioning algorithm 314 to determine actual SPL values for an outdoor unit 104 in order to configure a system capacity of the HVAC system 100 that meets noise level limits for the low-noise municipality. For example, communication interface 304 may communicate a "demand" to the outdoor controller 126 using the communication network 308 in order to meet the daytime and nighttime quiet operating modes. As used herein, a "demand" is a percentage of compressor speed that the outdoor unit 104 is allowed to run (i.e., rotational speeds of compressor 16 and outdoor fan 118) under the current conditions. In an example, the current conditions are outdoor ambient temperature. The outdoor fan 118, being coupled to the compressor 116, also runs based on the compressor speed and the outdoor ambient temperature. The instructions for commissioning algorithm 314 may be stored in outdoor controller 126, may be stored at communication device 310, or stored in a combination of the communication device 310 and the outdoor controller 126.

In an embodiment, commissioning algorithm 314 may be configured to use actual SPL values that are measured at the predetermined location while HVAC system 100 is operated in a cooling mode and/or a heating mode based on requested "demand" commands from the system controller 106 to the outdoor controller 126, outdoor ambient temperature and other sensor information including indoor temperature of residential building 202, indoor humidity of residential building 202, refrigerant temperatures and pressures at compressor 116, electrical currents, and internal component temperatures. The "demand" command is used to control compressor speed of the compressor 116 and fan motor speed of the outdoor fan 118 based on a correspondence between compressor and fan motor speeds and the "demand". In another embodiment, commissioning algorithm 314 may be configured to transmit speed commands from system controller 106 to outdoor controller 126 so as to directly control the compressor speed and fan speed using outdoor ambient temperature and other sensor information including indoor temperature of residential building 202, indoor humidity of residential building 202, refrigerant temperatures and pressures at compressor 116, electrical currents, and internal component temperatures. In these cases, the communication device 310 may measure an actual SPL value at the predetermined location during operation of the compressor 116 and outdoor fan 118. In an embodiment, communication device 310 may also measure background noise at the residence including at the predetermined location. The communication device 310 may communicate the SPL value and background noise to outdoor controller 126 and/or system controller 106 during execution by commissioning algorithm 314. In response, system controller 106 may selectively transmit additional instructions and/or commands, for example, instructions related to "demand" and rotational speed to the outdoor controller 126 that directly control the rotational speed of the compressor 116 and outdoor fan 118 to a maximum allowable rotational speed that is applicable to an operating mode in order to meet the noise level limits for the various periods of time. Commissioning algorithm 314 may determine whether the SPL values at the property line exceeds the noise level limits in effect at the particular time period as the compressor 116 and outdoor fan 118 are rotated at different rotational speeds. The rotational speeds of the compressor 116 and the outdoor fan 118 that satisfy the SPL for each time period may then be stored in memory at system controller 106 and/or communication interface 304. In one example, these rotational speeds that satisfy the SPL may be associated with the "demand" that is requested of the outdoor unit 104.

In an embodiment of controlling the outdoor unit 104 with rotational speeds of the compressor 116 and outdoor fan 118, during the daytime quiet and nighttime quiet operating modes, the rotational speed of compressor 116 and outdoor fan 118 may be iteratively controlled until the SPL values of the outdoor unit 104 meet the noise level limits for the low-noise municipality. In an embodiment, the compressor 116 and outdoor fan 118 are operated at a maximum rotational speed and SPL values are measured and communicated back to system controller 106 via communication device 310. For both the daytime quiet operating mode and the nighttime quiet operating mode, the SPL values may be predefined to not exceed a certain SPL value, in dBA. The system controller 106 receives the measured SPL values at the predetermined location and determines if the SPL values with the background noise measurements are acceptable for the particular operating mode. In an embodiment, background noise compensation may be applied to the measured SPL value if the measured background noise is greater than a first threshold value and is less than a second threshold value. In an example, the first threshold value is 3 dB and the second threshold value is 10 dB. In some non-limiting examples, background compensation is applied to the SPL value according to the following predefined thresholds. 0-3 dB background noise: no adjustment or compensation; 4-5 dB background noise: −2 dB adjustment; 6-9 dB background noise: −1 dB adjustment; >10 dB background noise: no adjustment. The compensation ranges may be changed based on the particular low-noise municipality. For example, the measured SPL values may be compensated by lowering the SPL value by an amount corresponding to the background noise in order to provide a compensated SPL value. If the compensated SPL value exceeds the noise level limit for the particular operating mode, the rotational speed of the compressor 116 and the outdoor fan 118 are incrementally adjusted by the outdoor controller 126. For example, the rotational speed of the compressor 116 and the outdoor fan 118 are incrementally increased or incrementally decreased from the initial rotational speed, and a noise level is measured for the new rotational speed. Additionally, a notification message indicating that the SPL value at the predetermined location is to be measured again, based on the new rotational speed of the compressor 116 and the outdoor fan 118, that is transmitted to the communication device 310.

Next, SPL values at the new rotational speed are measured by the communication device 310 and transmitted to the outdoor controller 126. The outdoor controller 106 determines a new compensated SPL value based on "demand" and compares these compensation SPL values to the acceptable sound limit for the particular operating mode. The commissioning algorithm 314 may repeat the steps using different rotational speeds to determine which rotational speed provides optimal results. For example, the process is repeated until the compensated SPL value meets the "demand" for a particular operating mode and the compressor 116 and outdoor fan 118 are rotating at the maximum allowable rotational speed to meet the noise level limit. Once the maximum allowable rotational speed of the compressor 116 and outdoor fan 118 is determined for a compensated SPL value, this information is transmitted by the outdoor controller 126 to the system controller 106 and stored in memory at the system controller 106. In an embodiment, the outdoor unit 104 may also be relocated to another location at the residential building if the SPL values exceed the noise level limits in effect. As defined herein, maximum rotational speed can refer to maximum revolutions per second of the compressor 116 and the outdoor fan 118. Once the commissioning algorithm 314 has determined the maximum allowable rotational speeds of the compressor 116 and the outdoor fan 118 for all "demand", this information is transmitted by to the system controller 106 by the outdoor controller 126. In another embodiment, "demand" instructions may be transmitted to the outdoor controller 126 rather than instructions that directly control rotational speeds of the compressor 116 and outdoor fan 118 (discussed above) while the other steps to iteratively determine the SPL values using the demand remain the same as described above with respect to the compressor speed and the outdoor fan speed.

Figure 4:
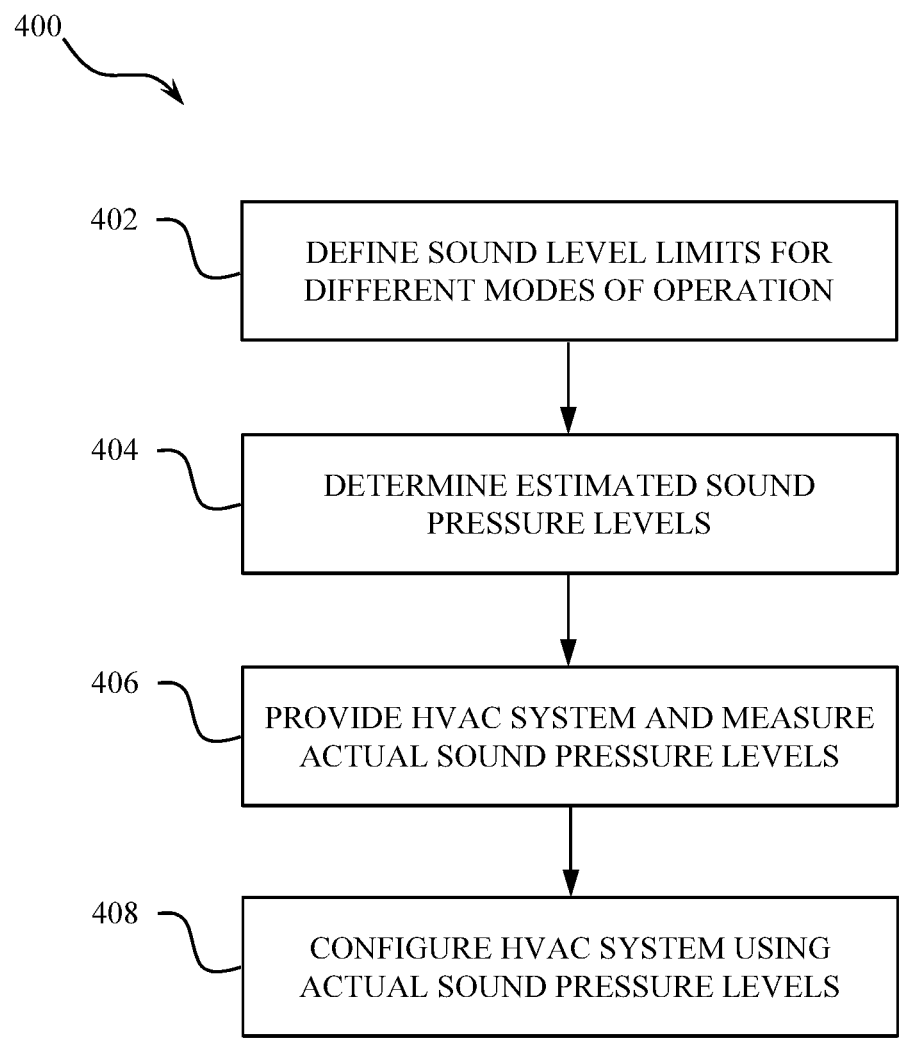
FIG. 4 is a flowchart for limiting operation of the HVAC system of FIG. 1 for low-noise municipalities according to an embodiment of the disclosure.

Referring now to FIG. 4, a method 400 is shown for limiting operation of an HVAC system for low-noise municipalities according to an embodiment of the disclosure. The method may be performed in the order shown, or in a different order. Further, two or more of the operations may be performed concurrently instead of sequentially. The method 400 will be described in conjunction with FIGS. 1 and 3.

The method 400 commences at block 402, where noise level limits are defined for different operating modes of the HVAC system 100. The noise level limits, in dBA, for the daytime quiet operating mode or other modes may be stored in a memory of a system controller 106 of the HVAC system 100. The noise level limits may be predefined by a low-noise municipality in which the HVAC system 100 is to be installed. In an embodiment, the noise level limits may be inputted into the system controller 106 by a user or technician of the HVAC system 100.

At block 404, estimated SPL values are determined for the HVAC system 100. For example, a pre-assessment algorithm 312 is executed to determine estimated SPL values at a predetermined location, for example, at a property line of a residential building or a habited location, so as to assess whether an outdoor unit 104 that is to be installed meets noise level limits defined by the low-noise municipality. The pre-assessment algorithm 312 may determine estimated SPL values, in dBA, for the various operating modes from user inputs related to a location of the outdoor unit 104 from the predetermined location. Sensor inputs (for example, background noise) from a sensor 316 or other sound sensors in the communication device 310 may be factored into the calculation of estimated SPL values. User and/or sensor inputs may include information related to background noise, quantity of reflective surfaces, such as fences, or other barriers at the property line that may help to attenuate any noise that may emanate from an outdoor unit 104, distance of the property line from the outdoor unit 104, sound power rating input of the outdoor unit 104, or the like.

In an embodiment, information related to sound power levels may be mapped to compressor speeds and fan speeds in order to estimate SPL values according to maximum rotational speeds of the compressor and the outdoor fan. The mapped speeds may be stored in a table in memory at the communication device 310 and may be used by pre-assessment algorithm 312 to determine estimated maximum daytime and nighttime compressor speed and outdoor fan speed and their corresponding estimated SPL values by using sound power levels of the outdoor unit, equipment location factor, barrier shielding factor, sound path factor, and distance to the point of evaluation (distance factor), or the like.

At block 406, the HVAC system 100 is provided and is operated in a heating mode and/or in a cooling mode. Actual SPL values are measured at the property line, at a habited location, or other various locations during HVAC 100 operation. At block 408, the HVAC system 100 is configured using the actual measured SPL values based on, for example, "demand" or compressor speed. For example, commissioning algorithm 314 is executed to configure the HVAC system 100 to operate in various modes during different periods, such as a daytime quiet operating mode and a nighttime quiet operating mode based on the actual measured SPL values using the "demand" or the compressor speed. The actual SPL values may be iteratively obtained for the outdoor unit 104 in order to configure a maximum rotational speed of compressor 116 and fan motor 118 to meet noise level limits for the low-noise municipality at the different time periods. The commissioning algorithm 314 may then store the information in the system controller 106. In an embodiment, a "demand" command (e.g., 50% demand) may be transmitted to outdoor controller 126 of outdoor unit 104 using a command signal from system controller 106. In another embodiment, the system controller 106 may selectively operate the HVAC system 100 by sending commands to the outdoor controller 126 related to controlling a compressor speed of the compressor 116. Based on these commands, a rotational speed of compressor 116 and outdoor fan 118 may be selectively controlled to a maximum allowable rotational speed that is applicable to each operating mode in order to meet the noise level limits during each period. In an embodiment, the requested demand may be lowered iteratively until a new requested demand meets the sound level limit for an operating mode of the HVAC system 100.

Accordingly, the method 400 disclosed herein may be employed to assess an outdoor unit 104 for suitability for use at a site or location to meet noise level limits in a low-noise municipality, and may be employed to configure the HVAC system 100 at a suitable location (e.g., at a property line, a habited location or another location adjacent to a residential building) using actual SPL values to meet the noise level limits, as the method 400 controls the outdoor unit to operate in different modes during various time periods while maximizing the capacity of the HVAC system 100.

Figure 5:
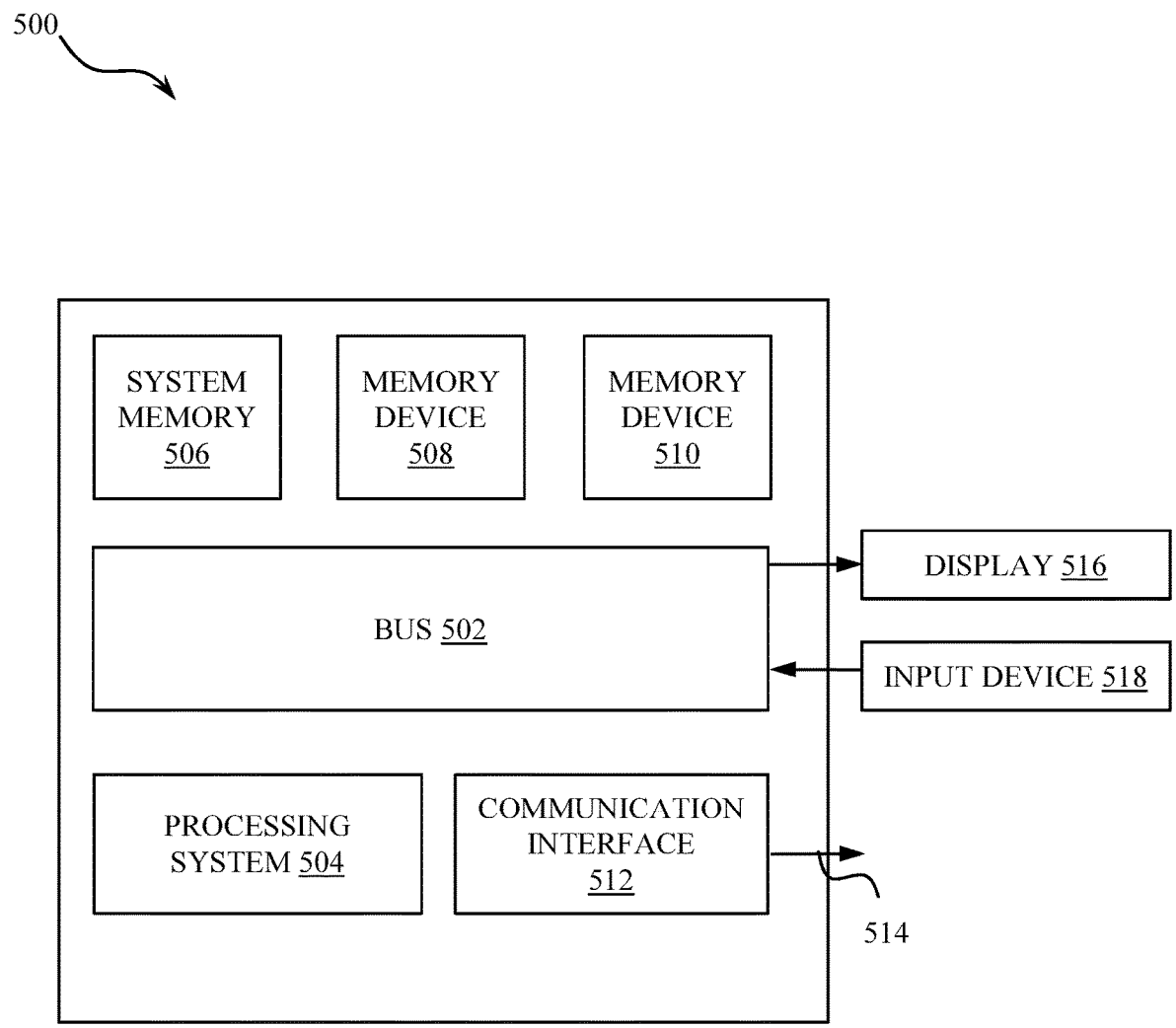
FIG. 5 is an example of a computing system according to an embodiment of the disclosure.

In some aspects, the various blocks, modules, circuits, methods, and systems disclosed herein may be implemented on any general-purpose network component, such as a computer or network component with sufficient processing power, memory resources, and network throughput capability to handle the necessary workload placed upon it. For example, FIG. 5 illustrates a block diagram of a computing system 500 capable of implementing aspects of the systems and methods disclosed herein and depicted in FIGS. 1-4. The system 500 may include various systems and subsystems. The system 500 may comprise a personal computer, a laptop computer, a workstation, a computer system, an appliance, a "smart" phone, an Application-Specific Integrated Circuit (ASIC) that is embodied in system controller 106 or communication device 310.

As shown in FIG. 5, the system 500 may comprise a system bus 502, a processing unit or system 504, a system memory 506, memory devices 508 and 510, a communication interface 512 (e.g., a network interface), a communication link 514, a display 516 (e.g., a terminal or screen), and an input device 518 (e.g., a keyboard, a touch pad, and/or a mouse). The system bus 502 can be in communication with the processing system 504 and the system memory 506. The additional memory devices 508 and 510, such as a hard disk drive, server, stand-alone database, or other non-volatile memory, can also be in communication with the system bus 502. The system bus 502 interconnects the processing system 504, the memory devices 506, 508, and 510, the communication interface 512, the display 516, and the input device 518. In some examples, the system bus 502 also interconnects an additional port (not shown), such as a universal serial bus (USB) port.

The processing system 504 may comprise a computing device and include an ASIC. The processing system 504 may further include a processing core. The processing system 504 is capable of executing a set of instructions to implement the various operations of disclosed herein.

The additional memory devices 506, 508, and 510 can store data, programs, instructions, database queries in text or compiled form, and any other information that is needed to operate a computer. The memories 506, 508, and 510 can be implemented as computer-readable media (integrated or removable) such as a memory card, disk drive, compact disk (CD), or server accessible over a network. In certain examples, the memories 506, 508, and 510 can comprise text, images, video, and/or audio, portions of which can be available in formats comprehensible to human beings. Additionally or alternatively, the system 500 can access an external data source or query source through the communication interface 512, which may communicate with the system bus 502 and the communication link 514. In some aspects, the communication interface 512, system bus 502, and/or communication link 514 may be communicatively coupled to one another via a wired or wireless communication link, such as an IEEE® 802.11 wireless network, an IEEE® 802.3 wired network, or any other suitable wired or wireless communication technology.

Computer executable logic for implementing the system 500 control may reside on one or more of the system memory 506 and the memory devices 508 and 510. The processing system 504 may be configured to execute one or more computer executable instructions originating from the system memory 506 and the memory devices 508 and 510. The term "computer readable medium" as used herein may refer to any suitable medium that participates in providing instructions to the processing system 504 for execution, and can include either a single medium or multiple non-transitory media operatively connected to the processing system 504.

Furthermore, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value.

Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the disclosure.

What is claimed is:

1. A sound level control system comprising:
   a heating, ventilation, and air conditioning (HVAC) system comprising a controller and an outdoor unit comprising a compressor and an outdoor fan; and
   a communication device located at a predefined distance from the outdoor unit and communicatively coupled to the HVAC system, wherein the communication device comprises a processor and a sound sensor, wherein the processor is configured to:
      receive first sound level measurements from the sound sensor in response to operating the outdoor unit in one of a cooling mode or heating mode;
      determine a first rotational speed of the compressor based on the first sound level measurements;
      determine a second rotational speed of the outdoor fan based on the first sound level measurements; and
      transmit the first rotational speed and the second rotational speed to the controller,
   wherein the controller is configured to:
      receive the first rotational speed and the second rotational speed;
      control the compressor to operate at or below the first rotational speed during a first time period;
      control the outdoor fan to operate at or below the second rotational speed during the first time period;
      receive an instruction related to selective control of the outdoor unit during the first time period;

selectively control the compressor to rotate at or below the first rotational speed, and the outdoor fan to rotate at or below the second rotational speed during the first time period.

2. The sound level control system of claim 1, wherein, the processor is further configured to:
receive second sound level measurements from the sound sensor in response to operating the outdoor unit in the cooling mode or heating mode;
determine a third rotational speed of the compressor based on the second sound level measurements;
determine a fourth rotational speed of the outdoor fan based on the second sound level measurements; and
transmit the third rotational speed and the fourth rotational speed to the controller,
wherein the controller is further configured to:
receive the third rotational speed and the fourth rotational speed;
control the compressor to operate at or below the third rotational speed during a second time period;
control the outdoor fan to operate at or below the fourth rotational speed during the second time period;
receive a second instruction related to selective control of the outdoor unit during the second time period;
selectively control the compressor to rotate at or below the third rotational speed, and the outdoor fan to rotate at or below the fourth rotational speed during the second time period.

3. The sound level control system of claim 2, wherein the first time period corresponds to a daytime quiet operating mode and the second time period corresponds to a nighttime quiet operating mode.

4. The sound level control system of claim 1, wherein the predefined distance comprises a distance between the outdoor unit and a property line.

5. The sound level control system of claim 1, wherein the processor is further configured to:
receive a user input comprising at least one of a quantity of reflective surfaces, the predefined distance, or a sound rating of the outdoor unit; and
determine an estimated noise level for both of the compressor and the outdoor fan at the predefined distance as a function of the user input.

6. A method for controlling a sound level of a heating, ventilation, and air conditioning (HVAC) system, the method comprising:
providing the HVAC system comprising a controller and an outdoor unit comprising a compressor and an outdoor fan;
communicatively coupling a communication device to the HVAC system, wherein the communication device comprises a processor and a sound sensor, and wherein the communication device is located a predefined distance from the outdoor unit;
receiving, by the communication device, first sound level measurements from the sound sensor in response to operating the outdoor unit in one of a cooling mode or heating mode;
determining, by the communication device, a first rotational speed of the compressor based on the first sound level measurements;
determining, by the communication device, a second rotational speed of the outdoor fan based on the first sound level measurements; and
transmitting, by the communication device, the first rotational speed and the second rotational speed to the controller,
receiving, by the controller, the first rotational speed and the second rotational speed;
configuring, by the controller, the compressor to operate at or below the first rotational speed during a first time period;
configuring, by the controller, the outdoor fan to operate at or below the second rotational speed during the first time period;
receiving, by the controller, an instruction related to selective control of the outdoor unit during the first time period;
selectively controlling, by the controller, the compressor to rotate at or below the first rotational speed, and the outdoor fan to rotate at or below the second rotational speed during the first time period.

7. The method of claim 6, further comprising:
receiving, by the communication device, second sound level measurements from the sound sensor in response to operating the outdoor unit in the one of a cooling mode or heating mode;
determining, by the communication device, a third rotational speed of the compressor based on the second sound level measurements;
determining, by the communication device, a fourth rotational speed of the outdoor fan based on the second sound level measurements; and
transmitting, by the communication device, the third rotational speed and the fourth rotational speed to the controller,
receiving, by the controller, the third rotational speed and the fourth rotational speed;
configuring, by the controller, the compressor to operate at or below the third rotational speed during a second time period;
configuring, by the controller, the outdoor fan to operate at or below the fourth rotational speed during the second time period;
receiving, by the controller, a second instruction related to selective control of the outdoor unit during the second time period;
selectively controlling, by the controller, the compressor to rotate at or below the third rotational speed, and the outdoor fan to rotate at or below the fourth rotational speed during the second time period.

8. The method of claim 6, further comprising:
receiving, by the communication device, a user input comprising at least one of a quantity of reflective surfaces, the predefined distance, or a sound rating of the outdoor unit; and
determining, by the communication device, an estimated noise level for both of the compressor and the outdoor fan at the predefined distance as a function of the user input.

9. The method of claim 7, wherein the first time period corresponds to a daytime quiet operating mode and the second time period corresponds to a nighttime quiet operating mode.

10. A method implemented by a communication device for commissioning a heating, ventilation, and air conditioning (HVAC) system comprising an outdoor unit and a controller, the method comprising:
receiving, at a communication device, information related to sound power levels of the outdoor unit, wherein the outdoor unit comprises an outdoor fan and a compressor;

receiving, at a communication device, a user input comprising at least one of a quantity of reflective surfaces, the predefined distance, or a sound rating of the outdoor unit;

determining, at a communication device, an estimated SPL value for each of a plurality of rotational speeds of the compressor and the outdoor fan according to the information related to the sound power levels and the user input; and determining, at a communication device, rotational speeds of the compressor and the outdoor fan from the estimated SPL values, wherein the rotational speeds correspond to an estimated SPL value less than a noise level limit;

receiving, at a communication device, first sound level measurements from the sound sensor in response to operating the outdoor unit in one of a cooling mode or heating mode;

determining, by a communication device, a first rotational speed of the compressor based on the first sound level measurements;

determining, by a communication device, a second rotational speed of the outdoor fan based on the first sound level measurements; and transmitting, by a communication device, the first rotational speed and the second rotational speed to the controller.

11. The method of claim 10, wherein the estimated SPL value is calculated based on the equation:

estimated SPL=sound power rating level+equipment location factor barrier shielding factor−sound path factor−distance factor.

12. The method of claim 10, further comprising transmitting, by the communication device, estimated SPL values for the rotational speeds of the compressor and the outdoor fan to a remote server associated with a municipality.

* * * * *